C. EVANS.
COMBINATION FORK AND SPOON.
APPLICATION FILED APR. 9, 1917.
1,277,205.
Patented Aug. 27, 1918.
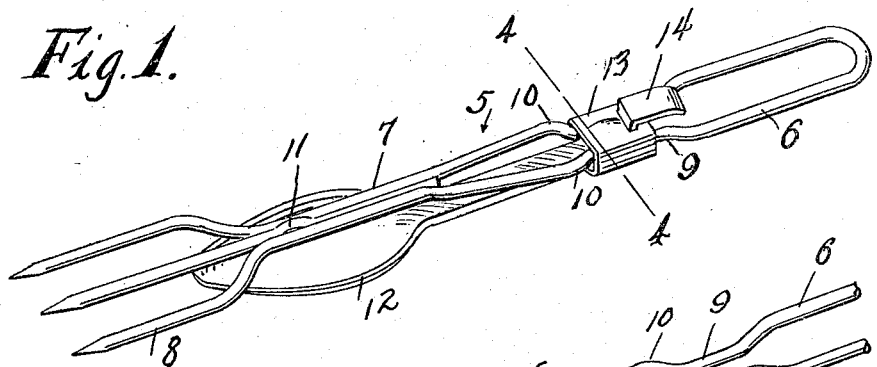
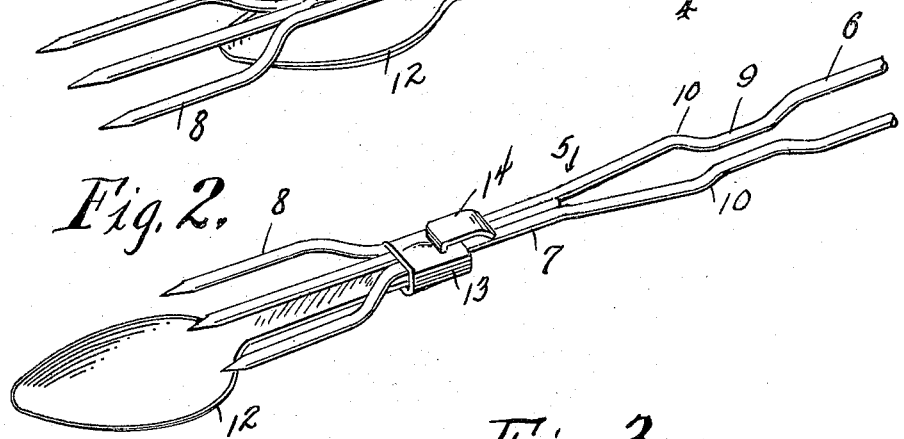
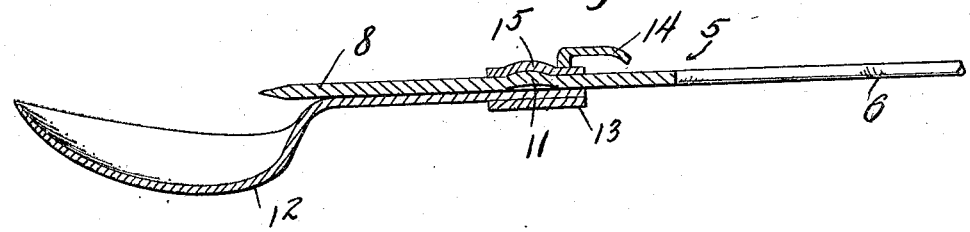
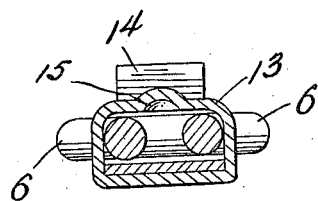
Witnesses
Inventor
C. Evans,

UNITED STATES PATENT OFFICE.

CATHERINE EVANS, OF PITTSBURGH, PENNSYLVANIA.

COMBINATION FORK AND SPOON.

1,277,205.

Specification of Letters Patent. Patented Aug. 27, 1918.

Application filed April 9, 1917. Serial No. 160,715.

*To all whom it may concern:*

Be it known that I, CATHERINE EVANS, a citizen of England, residing at Pittsburgh, in the county of Allegheny, State of Pennsylvania, have invented certain new and useful Improvements in Combination Forks and Spoons; and I do hereby declare the following to be a full, clear, and exact description of the invention, such as will enable others skilled in the art to which it appertains to make and use the same.

This invention relates to a combined fork and spoon, and has for an object the provision of an article of this character, the construction of which is such as to permit of selective utilization of the fork and spoon, novel means being embodied by which the fork and spoon are securely held in their respective positions.

A further object of the present invention resides in the provision of a fork having associated therewith a spoon that is normally retracted, but which may be quickly and conveniently moved into and out of operative position as occasion dictates.

Still another object is to provide a combined fork and spoon which embodies the desired feature of simplicity, efficiency and durability, and which may be manufactured and marketed at a relatively low cost.

With the above and other objects of similar nature in view, the invention consists in the construction, combination and arrangement of parts, set forth in and falling within the scope of the appended claim.

In the drawing,

Figure 1 is a perspective view of the article with the parts in the positions occupied when employed as a fork.

Fig. 2 is a similar view, with the parts in the position occupied when employed as a spoon.

Fig. 3 is a section taken longitudinally through Fig. 2, and

Fig. 4 is a detail section taken on the line 4—4 of Fig. 1.

Referring now more particularly to the accompanying drawing, there is shown a fork 5, preferably constructed of wire in the manner shown and including a handle portion 6, shank 7 and tines 8. Adjacent the handle 6, the wires forming the same are contracted as at 9 and from said contracted portions are directed, first in divergent relation and then extended convergently to produce relatively abrupt shoulders 10 the purpose of which will subsequently appear. It will be noted that the handle forming wires of the fork constitute the outer tines 8, while the center tine is extended between the wires of the shank 7 and secured thereto intermediate its ends, its inner end being freely movable with respect to said shank wires, and provided with an upward bend 11 for a purpose to appear. A spoon 12 is carried by fork 5 for movement longitudinally thereof into and out of position for use, the free end portion of its shank being connected with a sleeve 13, which slidably encircles the shank 7 of the fork and serves to adjustably support the spoon therefrom. The sleeve 13 carries on its upper wall a finger piece 14, by which it is manipulated to extend and retract the spoon, while said wall has further provided in its inner face a depression or recess 15. This recess 15 is adapted to receive the upward bend 11 of the center tine when the spoon is extended, the inner end of the tine yielding to permit said upward bend to pass into the recess, and thus releasably hold the spoon in position for use. When employing the fork, the spoon is retracted to the position shown in Fig. 1 with the sleeve 13 engaged about the contracted portions 9 of the wire and behind the shoulders 10, it being in this manner securely held against accidental displacement. To extend the spoon, it is only necessary to squeeze the handle sufficiently to disengage the shoulders 10 from the sleeve, after which the latter may be freely slid forwardly, as is evident.

What I claim is:—

The combination with a spoon having a bowl and a flat relatively short handle, of a sleeve fixed to and extending about said handle, a three tined fork having a contractible handle slidable through the sleeve for the positioning of the bowl outwardly beyond or inwardly of the fork tines, the handle of the fork being notched for locking engagement with the sleeve when said bowl is inwardly of the fork tines, the sleeve being formed with a socket, and a bight on one of
5 the tines of the fork to engage the socket to lock the bowl extended outwardly beyond the fork tines.

In testimony whereof I affix my signature in the presence of two witnesses.

CATHERINE EVANS.

Witnesses:
ALBERT R. BLUME,
G. W. LERCH.

Copies of this patent may be obtained for five cents each, by addressing the "Commissioner of Patents, Washington, D. C."